Sept. 17, 1968 P. F. GOOD 3,401,784
APPARATUS FOR ORIENTING ARTICLES
Filed Aug. 10, 1966 4 Sheets-Sheet 1

INVENTOR
Paul F. Good

BY Bailey, Stephens and Huettig
ATTORNEYS

INVENTOR
Paul F. Good
BY Bailey, Stephens and Huettig
ATTORNEYS

Sept. 17, 1968 P. F. GOOD 3,401,784
APPARATUS FOR ORIENTING ARTICLES
Filed Aug. 10, 1966 4 Sheets-Sheet 3

INVENTOR
Paul F. Good
BY
Bailey, Stephens and Huettig
ATTORNEYS

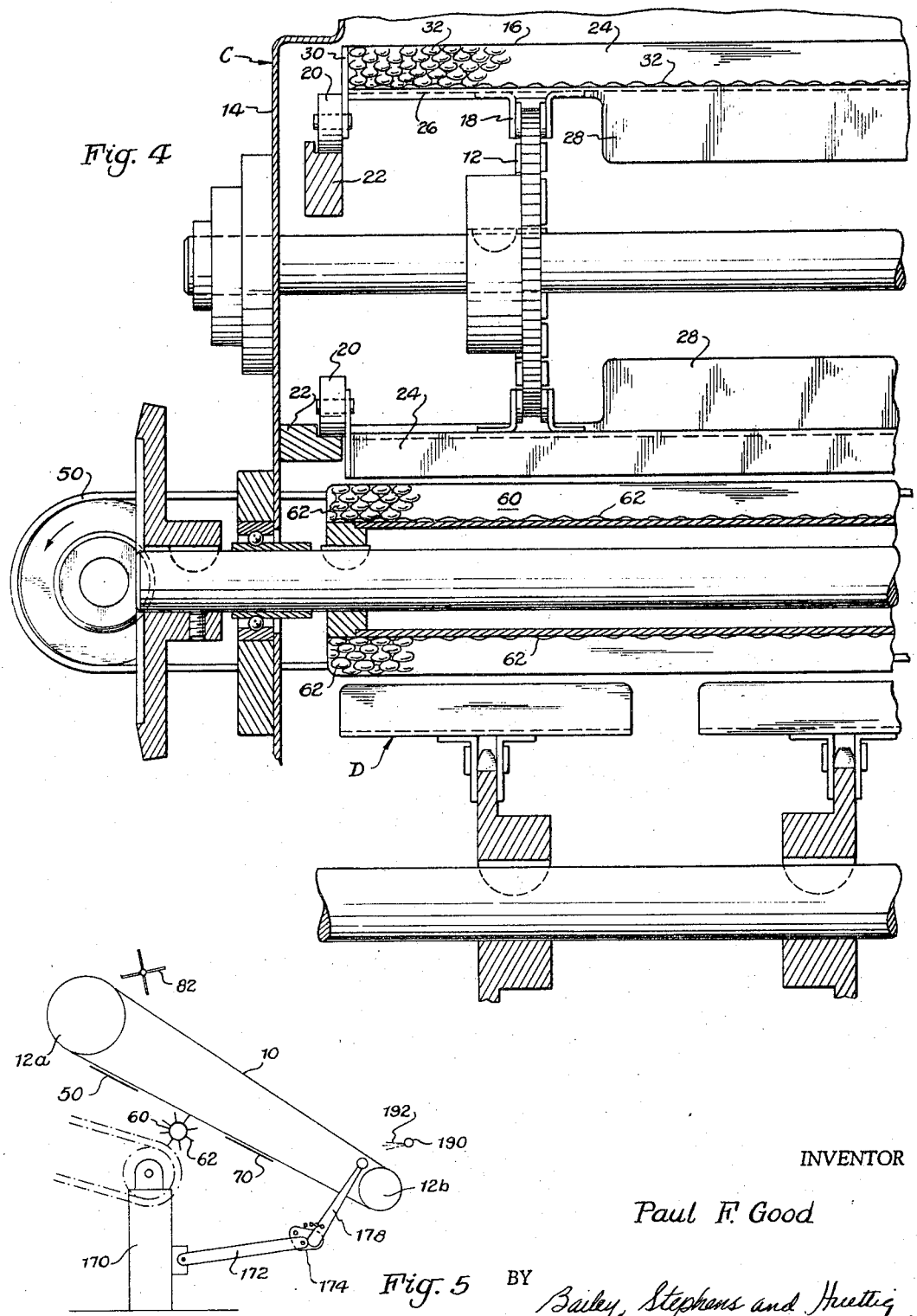

United States Patent Office 3,401,784
Patented Sept. 17, 1968

3,401,784
APPARATUS FOR ORIENTING ARTICLES
Paul F. Good, Lutherville, Md., assignor to Speedco, Inc., Baltimore, Md., a corporation of Maryland
Filed Aug. 10, 1966, Ser. No. 571,580
6 Claims. (Cl. 198—33)

ABSTRACT OF THE DISCLOSURE

In an apparatus for orienting articles, particularly sausages, a mass of unoriented articles is haphazardly dumped on top of a conveyor having flights and grooves between the flights. As the conveyor moves, the articles fall by gravity into the grooves and are not necessarily aligned in rows. The conveyor moves the articles past means for shifting each article in its groove so that all the articles are placed in aligned rows.

---

Figure 1:
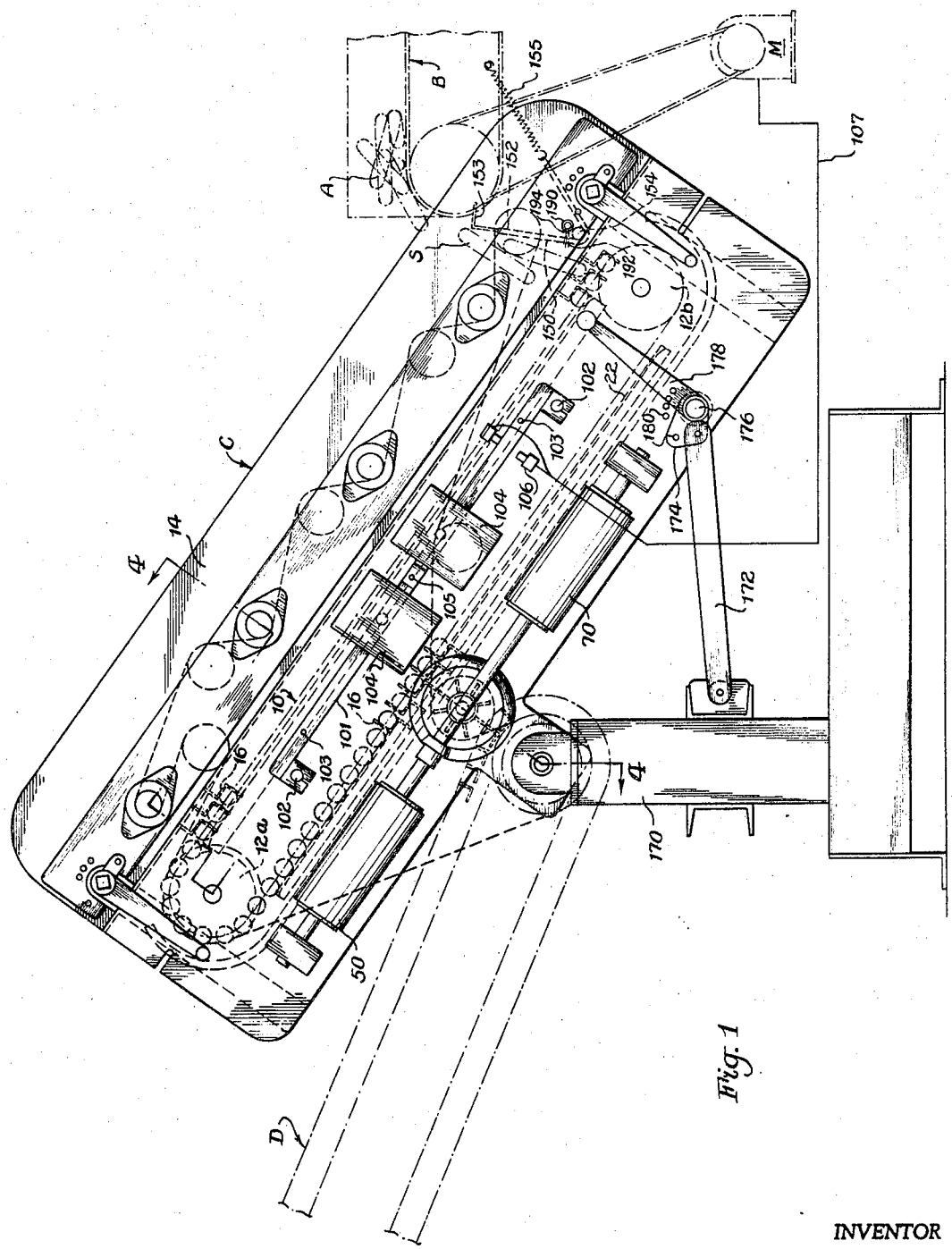

This invention relates to an apparatus for orienting articles and in particular to an apparatus for receiving a random mixed bunch of articles and then lining up the articles in an orderly row or rows so that the articles can then be fed to a packaging machine.

The apparatus of this invention is particularly adapted to handle sausages coming from machines that skin the artificial casings from sausages. The currently used high speed sausage skinning machines discharge sausages at such a rapid rate that the sausages are thrown and tumbled as they are discharged onto a receiving conveyor. Considerable manual labor is required to arrange the sausages in an orderly row or rows so that they can be transported to a packaging machine.

The object of this invention is to produce an apparatus which will receive a random mixed bunch of sausages lying in all directions and then move the sausages in such a way that they are arranged in a row or rows in an orderly manner for transfer to a packaging machine.

Another object of the invention is to produce a machine by which a large mass of tender sausages are quickly handled without damage to the sausages.

In general, these objects are obtained by tumbling the sausages onto the upper reach of an upwardly inclined conveyor composed of parallel flights spaced apart slightly more than the width of a sausage. As the sausages are conveyed upwardly, they are pushed or urged by paddle wheel means in an upwardly direction so that the sausages tend to arrange themselves parallel to the flights and drop into the spaces between the flights. The sausages are then conveyed to the lower reach of the conveyor where they become supported by a belt which moves transversely of the conveyor and thus the sausages are shifted lengthwise to one side of the conveyor. The sausages then having left the belt are subsequently dropped by gravity onto a transfer wheel composed of spaced blades. The sausages are nested between the blades of the transfer wheel and as they are thus carried are dropped in an orderly row or rows onto a discharge conveyor leading to a packaging machine. The surplus sausages which are not dropped into the transfer wheel are moved on downwardly where they are supported by a second transversely moving belt which moves the surplus sausages to one side of the conveyor, and in which position the sausages are recycled over the upper reach of the conveyor. The flights of the first conveyor can be of sufficient length to accommodate lengthwise several sausages. For example, if the sausages are to be aligned in two rows for feeding into the packaging machine, a flight length equal to the combined length of four or five sausages can be provided and thus increase the probability that there will be at least two sausages in each flight. A weighing means is also provided in order to sense the quantity of sausages on the upper flight of the conveyor so that the rate of the feed of the sausages onto the upper reach can be automatically regulated.

Figure 2:
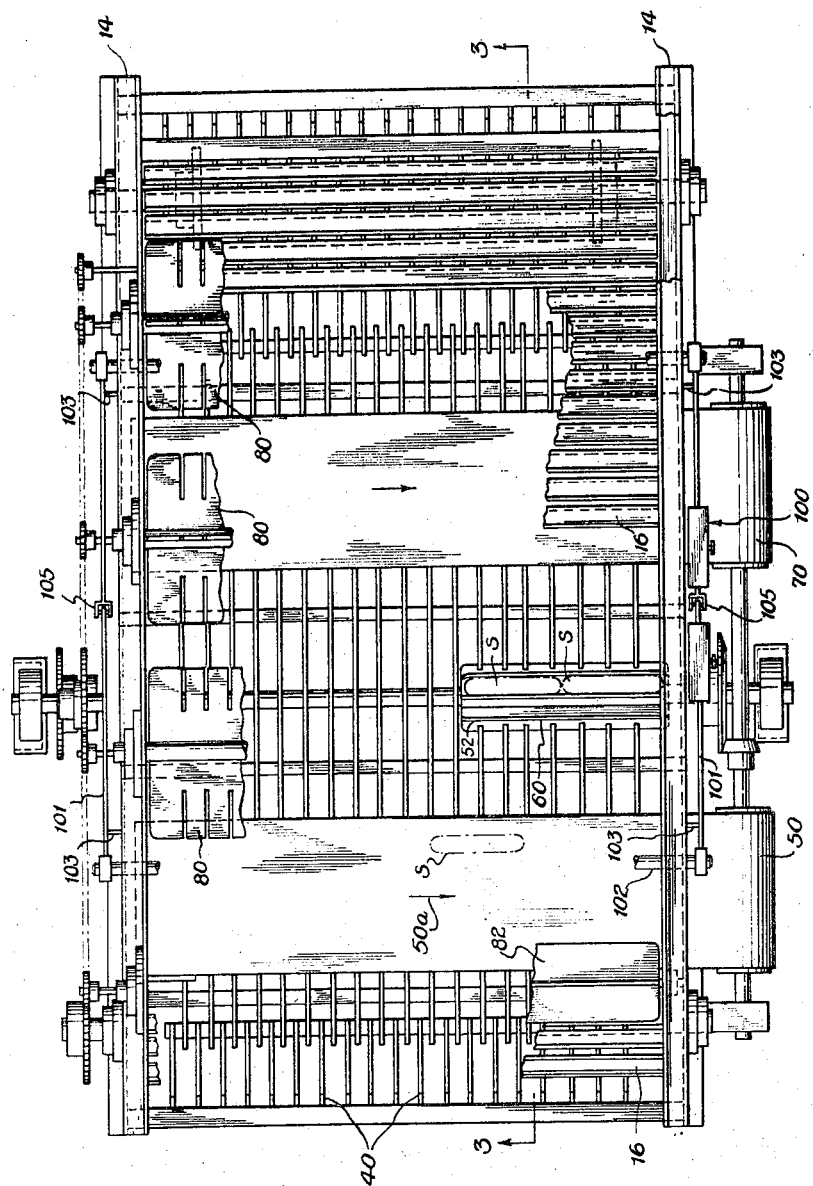
Figure 3:
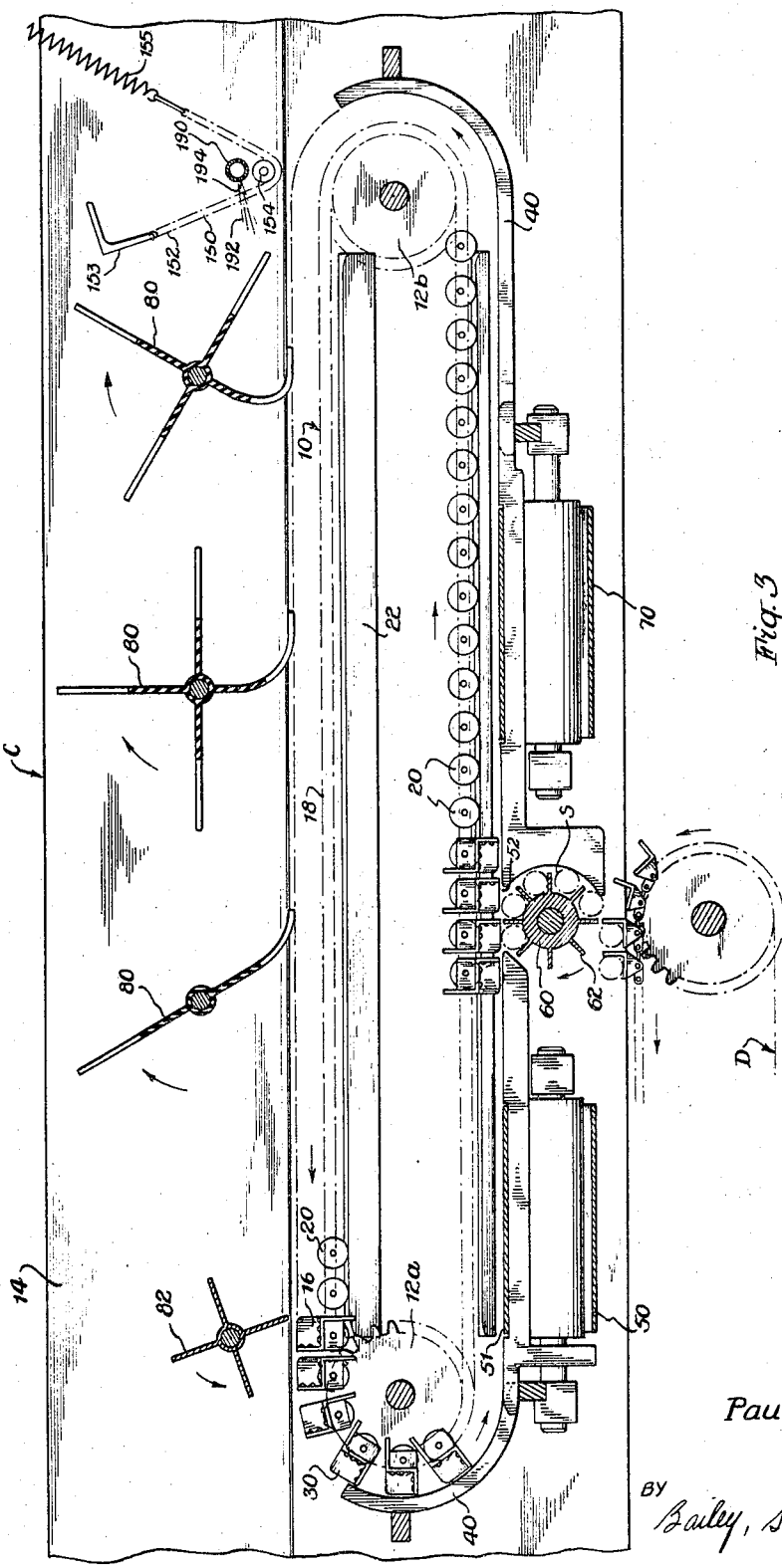

The means by which the objects of the invention are obtained are described more fully with reference to the accompanying drawings in which:

FIGURE 1 is a side elevational view of the apparatus;
FIGURE 2 is a plan view of FIGURE 1 with portions cut away;
FIGURE 3 is an enlarged cross-sectional view taken on the line 3—3 of FIGURE 2; and
FIGURE 4 is an enlarged cross-sectional view taken through one-half of the apparatus on the line 4—4 of FIGURE 1;
FIGURE 5 is a schematic view showing the use of different size sprockets in the apparatus.

As shown in FIGURE 1, a random mixed group of sausages A is on a supply conveyor B which receives the sausages from one or more sausage casing skinning machines. The random group of sausages is tumbled into the apparatus C of this invention from which orderly rows of sausages are transferred to a discharge conveyor D leading to a packaging machine.

The apparatus C is composed of an endless first conveyor 10 running around sprockets 12a and 12b which are mounted in an open top box-like frame 14. The conveyor 10 is composed of a plurality of parallel flights 16 attached to chains 18 engaging the teeth of the sprockets 12, note FIGURE 4. Each opposite end of each flight is fitted with a roller 20 which rides on a track 22. Each flight is composed of a plate 24 joined at a right angle to a plate 26, which latter is joined at a right angle to a stiffener plate 28. The ends of each flight are closed by plates 30. The surfaces of plates 24 and 26 are covered with bosses or dimples 32 so as to minimize the frictional contact between each sausage S and the flight.

The lower reach of the conveyor 10 is similar to the upper reach but in inverted position. A plurality of parallel support bars 40 extend partially around the sprockets 12 and beneath the lower reach of conveyor 10 in order to support the sausages except at certain positions, as will be hereafter described. Mounted transversely beneath the higher end portion of the lower reach is an endless belt 50. The upper surface of this belt extends across the full width of the lower reach and moves toward the side of the lower reach as indicated by the arrow 50a in FIGURE 2. The upper reach of the belt 50 rides in a notched recess 51 in the bars 40 so as to be flush with the top of the bars. Following belt 50 is an opening 52 through bars 40, and beneath which is a transfer wheel 60 having spaced blades 62 between which sausages are adapted to be received. Following the transfer wheel 60 in the downward direction of the lower reach of the first conveyor 10 is a second belt 70 similar to belt 50.

Mounted above the upper reach are a plurality of paddle wheels 80 having flexible blades which are rotatably driven in the direction of travel of the upper reach. As shown in FIGURE 3, paddles 80 rotate clockwise to sweep the sausages upwardly. At the top end portion of the upper reach is another paddle wheel 82 which revolves in a direction opposite to the direction of travel of the upper reach. Thus paddle 82 rotates counterclockwise to sweep the sausages downwardly.

Mounted on the side of first conveyor 10 is a weighing mechanism 100. This weighing mechanism is composed of two beams 101 on each side of frame 14 and which are fixed to transverse shaft 102 which pivotally support the tracks 22 of the upper reach. Each beam is joined to the frame 14 of the machine by pivot pins 103. Counterweights 104 are movably mounted on the beams. The two beams are connected by a roller joint 105. Movement of the pivoted beams in response to changes in the quantity of sausages on the upper reach actuates one of a pair of electric switches 106 which is electrically connected by wires 107 to the variable speed motor drive M for the conveyor B. Thus the speed of conveyor B and the number of sausages tumbled into the apparatus C is made dependent upon the weight of the sausages on the upper reach of conveyor 10.

The lower end of the upper reach of conveyor 10 is closed off by mesh belt 150 which has its upper end 152 secured to angle 153 extending across frame 14 and turns around a shaft 154 adjacent the surface of the upper reach of conveyor 10. The mesh belt then extends upwardly and is connected by means of spring 155 to conveyor B. This mesh belt prevents sausages from dropping off the lower end of the upper reach while the spring 155 permits automatic adjustment of the mesh belt when the inclination of the conveyor 10 is changed.

The inclination of the machine is increased as stickier sausages are run through the machine. For example, the frame 14 is given a greater inclination to make sticky sausages fall down the upper reach rather than accumulating at the top end of the upper reach. As shown in FIGURE 1, frame 14 is pivotally mounted on the top of a post 170. An arm 172 pivotally attached to post 170 is pivotally joined to a plate 174 rotatably mounted on a stub shaft 176 fastened to frame 14. A handle 178 is secured to plate 176. Matching pin holes 180 extend through plate 174 and frame 14. Turning of handle 178 changes the inclination of frame 14 to any desired angle, and this position is held by inserting a pin through the matched pin holes.

As shown in FIGURE 5, the upper reach of conveyor 10 is preferably kept at a greater inclination than the lower reach by using an upper sprocket 12a which is larger than the lower sprocket 12b. This is because sticky sausages tend to pile up adjacent paddle 82. The greater inclination of the upper reach given by sprocket 12a makes the sausages fall down the slope of the upper reach so that they will fall into the flights, while at the same time the lower reach is kept nearer the horizontal so that the sausages will more easily fall onto the belt 50, transfer wheel 60 and belt 70, respectively.

The tendency of the sausages to stick together and to the machine is reduced by moistening them. This is done by a perforated steam pipe 190 mounted above shaft 154. Sterile steam jets 192 are ejected through perforations 194 and moisten the sausages lying on the upper reach of the conveyor 10.

In operation, sausages are fed onto the upper reach of the first conveyor 10 and conveyed in an upwardly direction as shown in FIGURE 1. The paddles 80 revolve clockwise and have the dual function of sweeping the sausages upwardly above the flights of the conveyor 10 and acting as stops for preventing the sausages from rolling downwardly on top of the flights. This sweeping movement tends to align the sausages parallel to the plates 24 so that the sausages will drop down between adjacent pairs of plates 24. The object is to get the openings between the flights as nearly completely filled as possible before the sausages reach the counterclockwise rotating paddle wheel 82 at the upper end portion of the upper reach. At this point, any sausages which have not dropped completely into the flights are swept downwardly by paddle wheel 82 until they reach an opening into which they can drop. The sausages held in the flights are then conveyed over the upper sprocket 12a and are prevented from dropping out of the flights by the rails 40. When the sausages reach the belt 50, they roll slightly to reduce any frictional contact with the flights and are shifted to the discharge end of the flights. As shown in FIGURE 2, two of the sausages S in each flight will be brought above transfer wheel 60 and will drop by gravity into the space between two adjacent blades 62 in that wheel. The transfer wheel then rotates the sausages into alignment with corresponding flights on the discharge conveyor D. The sausages are thus arranged in orderly rows on the flights of conveyor D so that aligned rows of sausages reach the packaging machine in proper order.

Each flight of conveyor 10 above transfer wheel 60 has now discharged two of its sausages. Any surplus sausages still in the flights continue their travel until they contact belt 70 where they are moved to the discharge end of the flight. As conveyor 10 continues to revolve, these sausages are recycled to the upper reach and advanced to the lower reach where at least two of the recycled sausages are discharged into the transfer wheel 60. At the same time, the unfilled end of the flights in the upper reach of conveyor 10 are being filled by sausages being continually tumbled onto the upper reach from conveyor B.

Having now described the means by which the objects of the invention are obtained;

I claim:

1. An apparatus for receiving a mass of articles and orienting them for transfer to a subsequent operation comprising first inclined conveyor means for receiving a mass of unoriented articles dropped on top of said conveyor means, said conveyor means having a plurality of parallel flights forming grooves, each being slightly wider than the article to be received in a groove, paddle wheel means mounted above said first inclined conveyor means and extending substantially across the width of said first inclined conveyor means for sweeping articles forwardly on said inclined conveyor means and into at least some of said grooves, shifting conveyor means for shifting articles in said grooves transversely of said first inclined conveyor means for being aligned, and transfer means for removing aligned and oriented articles from the grooves.

2. An apparatus as in claim 1, further comprising third conveyor means for shifting articles in said grooves which were not aligned with and removed by said transfer means.

3. An apparatus as in claim 1, further comprising weighing means for measuring the weight of the articles on said first conveyor means.

4. An apparatus as in claim 1, further comprising boss means on said flights for minimizing the frictional contact between the articles and the flights.

5. An apparatus for receiving a mass of elongated sausages and orienting them for transfer to a conveyor comprising first endless conveyor means having an upper reach and a lower reach each inclined to the horizontal for receiving an unoriented mass of sausages tumbled onto the lower end of the upper reach for movement upwardly on said upper reach and downwardly on said lower reach, said conveyor means including flights corresponding to the desired positioning of said sausages on said conveyor means, paddle wheel means mounted above said upper reach for sweeping forwardly said sausages into position in said flights, guide means beneath said lower reach for holding sausages in the lower reach flights, opening means in said guide means for permitting a predetermined number of sausages to drop through said guide means, second conveyor means mounted transversely beneath the upper end portion of said lower reach for moving sausages within said flights across said flights, and transfer wheel means below said opening means and adjacent said second conveyor means for receiving at least some of the sausages which have been moved by said second conveyor means and dropped from said lower reach and for transferring the now oriented articles to a further operation.

6. An apparatus as in claim 5, further comprising third conveyor means mounted transversely beneath said lower reach following said transfer wheel means for moving any remaining articles in said lower reach to positions aligned with said transfer wheel means and for recycling said articles to said upper reach.

(References on following page)

References Cited

UNITED STATES PATENTS

| | | | |
|---|---|---|---|
| 723,971 | 3/1903 | Acklin | 198—174 |
| 1,580,193 | 4/1926 | Fooks | 198—159 |
| 1,945,090 | 1/1934 | Smith | 198—20 |
| 2,783,890 | 3/1957 | Hanland | 198—174 |
| 3,158,251 | 11/1964 | Skola | 198—32 |
| 1,487,882 | 3/1924 | Parker | 198—167 |
| 2,828,788 | 4/1958 | Ashlock | 198—33 |
| 2,920,737 | 1/1960 | Engleson | 198—29 |
| 2,990,937 | 7/1961 | Goslin | 198—39 |
| 3,180,475 | 4/1965 | Del Rosso | 198—39 |

RICHARD E. AEGERTER, *Primary Examiner.*